(12) United States Patent
Scudder et al.

(10) Patent No.: US 7,778,248 B2
(45) Date of Patent: Aug. 17, 2010

(54) METHOD AND APPARATUS FOR PRIORITIZED PROCESSING OF ROUTING INFORMATION

(75) Inventors: John Scudder, Ann Arbor, MI (US); David D. Ward, Somerset, WI (US); Paul Jensen, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 11/262,060

(22) Filed: Oct. 28, 2005

(65) Prior Publication Data

US 2007/0097973 A1    May 3, 2007

(51) Int. Cl.
*H04L 12/28* (2006.01)
*H04J 3/16* (2006.01)
(52) U.S. Cl. ........................... 370/392; 370/465
(58) Field of Classification Search ............. 370/395.42
See application file for complete search history.

(56) References Cited

U.S. PATENT DOCUMENTS

| | | | |
|---|---|---|---|
| 7,006,440 B2* | 2/2006 | Agrawal et al. ............. 370/235 |
| 7,035,256 B1* | 4/2006 | Neufeld et al. ............. 370/389 |
| 2002/0078196 A1* | 6/2002 | Kim et al. .................... 709/224 |
| 2003/0117954 A1* | 6/2003 | De Neve et al. ............. 370/230 |
| 2004/0210892 A1* | 10/2004 | Sharma ...................... 717/168 |
| 2005/0188100 A1* | 8/2005 | Le Roux et al. ............. 709/238 |
| 2006/0013230 A1* | 1/2006 | Bosloy et al. ............ 370/395.42 |
| 2007/0078970 A1* | 4/2007 | Zabihi et al. ................ 709/224 |

OTHER PUBLICATIONS

Bates, T. et al., "Multiprotocol Extensions for BGP-4," Network Working Group, RFC 2858, Jun. 2000, 10 pages.

* cited by examiner

*Primary Examiner*—Daniel J Ryman
*Assistant Examiner*—John Blanton
(74) *Attorney, Agent, or Firm*—Hickman Palermo Truong & Becker LLP

(57) ABSTRACT

A method is disclosed for prioritized processing of routing information in a network element. A priority is assigned to routing information received at the network element. The priority and the routing information are stored in a Routing Information Base (RIB) of the network element. The routing information is transferred from the RIB to a Forwarding Information Base (FIB) of the network element according to the priority assigned to the network element.

42 Claims, 5 Drawing Sheets

METHOD AND APPARATUS FOR PRIORITIZED PROCESSING OF ROUTING INFORMATION

FIELD OF THE INVENTION

The present invention generally relates to network elements in computer networks. The invention relates more specifically to a method for prioritized processing of routing information at network elements.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Modern network elements that forward packets in packet-switched networks typically separate their forwarding services (e.g. the tasks of moving packets from one network interface to another) from their routing services (e.g. the tasks of determining the best path through the network). For example, a network element, such as a router, typically receives a packet at one of its network interfaces and forwards the packet to another of its network interfaces. In making the decision to which network interface to forward the packet, the network element typically uses information included in the header of the packet, as well as routing information stored and managed by the network element.

The routing information managed by a network element comprises information about the connectivity between the nodes of the network in which the network element is established, and information about the connectivity to nodes in other networks.

For example, the routing information may include the routes to the network destinations that are reachable from the network element. A route comprises an address destination, which is usually represented by an address prefix (also referred to as prefix), and information that describe the path to the address destination. The address prefix may be expressed as a combination of a network address and a mask that indicates how many bits of the address are used to identify the network portion of the address. The information that describes the path to the address destination may include, for example, the address of a node that is the next hop to the address destination, the list of Autonomous Systems (ASs) that must be traversed in order to reach the address destination, and the network address of the node that originated the route.

The routing information managed by a network element may also include information that indicates the type of each network interface of the network element, the network node or nodes that are connected to the network element over each network interface, and various other parameters that may be associated with the network element or its network interfaces.

A network element that separates its forwarding service from its routing service typically stores all of its routing information in a Routing Information Base (RIB). Each routing protocol that executes on the network element selects its own set of best routes, and installs those routes and their attributes in the RIB. Within a routing protocol, the routes are selected based on one or more criteria, or metrics, used by that protocol. A RIB process periodically traverses the routes in the RIB and selects the best overall route to each address destination by comparing the attributes of all routes to that destination. The routes identified in the RIB as best routes are then transferred, or downloaded, to one or more Forwarding Information Bases (FIBs) that are used for forwarding packets by the one or more network interfaces of the network element. Thus, at any given point in time a FIB maintains an image of all or a subset of the routing information contained in the RIB. When routing or topology changes occur in the network, the routing information in the RIB is updated and the changes to the routing information are reflected in the one or more FIBs.

Network elements may store the routing information in the RIB as one or more logically or physically separate routing tables to facilitate orderly management of different services. For example, a network element that supports Virtual Private Network (VPN) features usually manages the routes of different VPNs in separate logical or physical routing tables. In another example, a network element may manage routes for different topologies, such as, for example, topologies associated with a different Quality of Service (QoS), in separate routing tables. Further, a plurality of network elements may execute as a virtual router, and each network element in the virtual router may store the RIBs of the other network elements of the virtual router in logically or physically separate routing tables.

The order of transferring data from a RIB to a FIB may affect the availability of services. Even though the routes in the RIB may be managed in separate routing tables, since the network element does not have the capability to treat these separate routing tables differently, the network element has no way to determine which routing tables should be downloaded first to the FIB when a routing or a topology change occurs.

For example, suppose that a network element is established on the edge of an Internet Service Provider (ISP) network. Further, suppose that the ISP provides a VPN connectivity for one of its customers, and that the network element stores the routes of the VPN in a separate VPN Route Forwarding (VRF) routing table of its RIB. Suppose also that a routing or a topology change causes changes to both the routes in the VRF table and the routes in the network element's large Internet routing table. In order to ensure uninterrupted forwarding service, the network element must download these changes as fast as possible from the RIB to the FIBs of its network interfaces. However, since the network element does not have the ability to distinguish priority among the routes nor any routing tables of its RIB, the network element may download the routes from its large Internet routing table before it downloads to the FIBs the routes from the VRF routing table. Thus, the forwarding service on Internet routes will be restored before the forwarding service on the customer's VPN routes even though the VPN customer may have been promised premium service.

This inability of the network element to determine which routing information should be first downloaded to the FIB may also cause interruption of forwarding service on individual routes. Suppose that a routing protocol installs in the RIB a new address prefix for a destination for which an interrupted forwarding service is guaranteed. Since the network element is unable to determine the importance of the new address prefix with respect to forwarding, the network element will treat the new address prefix as a normal prefix and will continue with downloading other address prefixes first. As a result, the new address prefix may not be downloaded to the FIB for a while, and in the meantime the forwarding service to the destination is interrupted.

Based on the foregoing, there is a clear need for a technique for improved processing of routing information at network elements.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
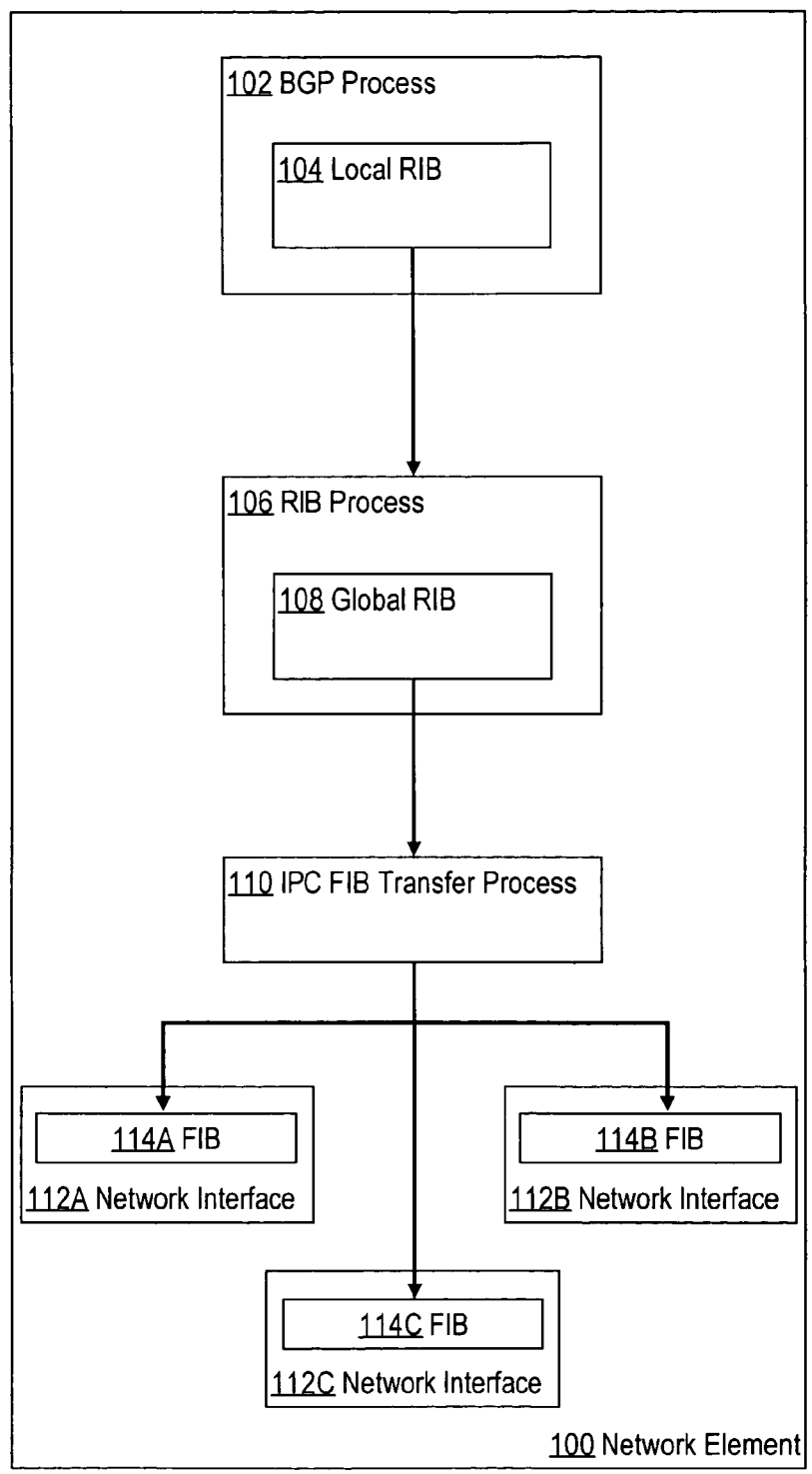
FIG. 1A is a block diagram that illustrates various components of a network element that are involved in prioritized processing of routing information according to one embodiment.

A method and apparatus for prioritized processing of routing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Prioritized Processing of Routing Information
   3.1 Prioritized Processing of VPN Routing Information
   3.2 Prioritized Processing of Individual Address Prefixes
   3.3 Prioritized Processing of BGP Next Hop Tracking Information
   3.4 Prioritized Processing of Multi-Topology Routing Information
   3.5 Priority Queues and Use of the Priority Information in the FIB
   3.6 Additional Features and Alternative Embodiments
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for prioritizing the processing of information in a network element. A priority is assigned to routing information received at the network element. The priority in association with the routing information are stored in a Routing Information Base (RIB) of the network element. The routing information is transferred from the RIB to a Forwarding Information Base (FIB) of the network element according to the priority assigned to the network element.

In a feature of this aspect, the priority is a particular priority of a plurality of priorities that are specified in configuration data, where each priority of the plurality of priorities is associated in the configuration data with one or more types of routing information.

In one feature of the aspect, the priority is a particular priority of a plurality of priorities. The routing information is transferred from the RIB to the FIB only when no other routing information, which is assigned a higher priority than the particular priority, is available for transfer from the RIB to the FIB. Further, in some embodiments the transferring of the routing information may also involve using one or more scheduling algorithms that are based at least in part on the particular priority.

In a feature of this aspect, the routing information comprises routes stored in a Border Gateway Protocol (BGP) routing table. A BGP process that executes on the network element receives a BGP message, which includes one or more routes. The one or more routes are stored in the BGP routing table. A first set of the one or more routes are selected for transferring to the RIB. The BGP process then assigns the priority to the first set of the one or more routes in the BGP routing table. In this feature, the BGP message may further include first data that associates the priority with the one or more routes. The BGP routing table may be a Virtual Route Forwarding (VRF) table that is associated with a Virtual Private Network (VPN).

In one feature of the aspect, an Interior Gateway Protocol (IGP) process that executes on the network element receives an IGP message. The IGP message includes one or more address prefixes and first data that associates the priority with the one or more address prefixes, where the routing information comprises the one or more address prefixes.

In a feature of the aspect, the routing information comprises one or more address prefixes that represent next hops for one or more routes stored in the RIB of the network element.

In one feature of the aspect, the routing information is received at the network element from one or more IGP processes, where the routing information comprises one or more routing tables that are associated with one or more types of network topologies. Each routing table of the one or more routing tables is assigned a specific priority of the plurality of priorities.

In a feature of this aspect, in addition to transferring the routing information, the priority assigned to the routing information is also transferred from the RIB to the FIB. The priority is stored in the header of a packet that transfers the routing information from the RIB to the FIB.

In one aspect, a method is disclosed for prioritizing the processing of information in a network element. A particular priority of a plurality of priorities is assigned to a particular set of routes of one or more sets of routes that are received at the network element. The particular set of routes is installed in a RIB of the network element, where the particular priority assigned to the particular set of routes is also stored in the RIB. The particular set of routes and the particular priority are transferred from the RIB to one or more FIBs, which are associated with one or more network interfaces of the network element, according to the particular priority.

In a feature of this aspect, the method further comprises placing the set of routes in a particular queue of a plurality of queues maintained at the RIB. Each queue of the plurality of queues is associated with one priority of the plurality of priorities, where the particular queue is associated with the particular priority.

In one feature of the aspect, the particular set of routes is placed in the particular queue before installing the particular set of routes in the RIB.

In a feature of this aspect, the particular set of routes is placed in the particular queue after installing the particular set of routes in the RIB.

In one feature of the aspect, the particular set of routes is retrieved for transferring from the RIB to the one or more FIBs only when there are no sets of routes available for transferring in any queue that is assigned a higher priority than the particular priority.

In other aspects, the invention encompasses a computer apparatus and a computer-readable medium configured to carry out the foregoing steps.

2.0 Structural and Functional Overview

Figure 3:
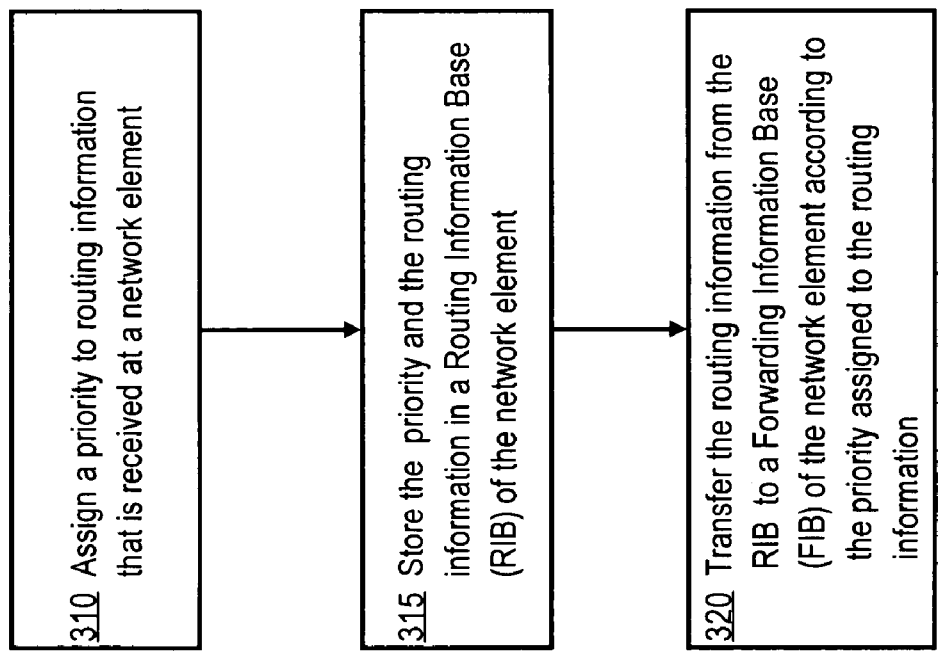
FIG. 3 is a flow diagram that illustrates a high level overview of one embodiment of a method for prioritized processing of routing information.

FIG. 3 is a flow diagram that illustrates a high level overview of one embodiment of a method for prioritized processing of routing information.

In step 310, a priority is assigned to routing information that is received at a network element. The routing information may include one or more routes that are maintained in one or more routing tables. Each routing table may be associated with a particular priority of one or more priorities. Thus, received routes that need to be stored in a particular table may be assigned the particular priority associated with that table. Alternatively, a route that is received at the network element may be tagged with a particular priority when it is received. In this case, the network element will store the route in a routing table having priority that matches the priority with which the route is tagged.

In some embodiments, the plurality of priorities associated with the routing tables of a network element may be specified by a user, such as a network engineer, in a configuration file. In addition, each routing table may be assigned a default priority, which may be overridden by specifying a different priority for that routing table in the configuration file.

In the simplest example, the plurality of priorities may include a "High" and a "Low" priority. In more complex examples, the priorities associated with routing tables may include "High", "Medium", "Low", and "Other" priorities. In the latter examples, each of the priority may be represented by a numerical value, where the order of the numerical values indicates the relative importance or strength of the priority (e.g. "1" represents "High" priority, "2" represents "Medium" priority, "3" represents "Low" priority, etc.) The priorities assigned to routing tables may also be based on any kind of criteria, such as, for example, whether the priorities are specified by a user (e.g. a "User" priority) or by the Operating System (e.g. a "System" priority). Further, in different embodiments, the plurality of priorities may include tens, hundreds, or even thousands of priority levels in order to provide for fine-grained prioritization. The techniques for prioritized processing of routing information described herein are not limited to any particular priority or prioritization scheme, and for this reason the examples provided above are to be regarded in an illustrative rather than a restrictive sense.

In step 315, the routing information and the priority assigned to it are stored in a Routing Information Base (RIB) of the network element. In some embodiments, the routing information may comprise one or more routes that are stored in the RIB, and the priority assigned to each route may be stored as an attribute of that route. In other embodiments, the priority assigned to received routes may be stored as an attribute of the routing table in which the routes are stored. In these embodiments, all routes stored in a particular routing table of the RIB have the same priority.

In some embodiments, the priority associated with the routing information may be derived from attributes stored for the routing information. In these embodiments, routing information priority may not necessarily be stored but instead may be computed from stored attributes on the fly. For example, a function that maps routing information attributes to priorities may be made known to RIB or FIB processes or to any other entities that process routing information. When such entities have access to the relevant routing information attributes, each entity may use the function to determine the routing information priority on the fly based on these attributes.

In step 320, the routing information is transferred, or downloaded, from the RIB to a Forwarding Information Base (FIB) of the network element according to the priority assigned to the routing information. For example, routing information that is assigned a higher priority is transferred from the RIB to the FIB before the transfer of any routing information that is assigned a lower priority. In general, routing information is transferred from the RIB to the FIB only when no other routing information, which other routing information is assigned a higher priority, is available for transfer from the RIB to FIB.

FIG. 1A is a block diagram that illustrates various components of a network element that are involved in the prioritized processing of routing information according to one embodiment.

Network element 100 is an entity that is capable of forwarding packets in a packet-switched network. In one embodiment, the network element is a router. In different embodiments, the network element may be a route server, or any other computer system that is capable of receiving messages and forwarding them to other entities in the network. Network element 100 may be implemented with software components, or as a combination of software and hardware components.

In the embodiment depicted in FIG. 1A, network element 100 comprises Border Gateway Protocol (BGP) process 102, RIB process 106, and Inter-Processor Communication (IPC) FIB transfer process 110. Network element 100 also includes one or more network interfaces, such as network interfaces 112A, 112B, and 112C.

BGP process 102 is configured to receive and maintain routing information in conformance with the BGP routing protocol. BGP is a peer-to-peer Exterior Gateway Protocol (EGP) that is used to exchange routing information among network elements (usually routers) in the same or different autonomous systems. In operation, BGP process 102 receives routes in BGP messages that are sent to network element 100 from other BGP peers. One or more route selection and/or route configuration algorithms are applied to the received routes, and the selected routes, which usually represent the best paths to the routes' respective destinations, are stored in local RIB 104.

In some embodiments, BGP process 102 may apply a priority to the received routes before the routes are stored in local RIB 104. For example, the received routes may be tagged with a specific priority in the messages in which they are received. In this case, BGP process 102 carries the specific priority of the received routes through the route selection algorithms, and then stores the selected routes and their associated priorities in local RIB 104. In other embodiments, BGP process 102 first stores the selected routes in local RIB 104. Then, BGP process 102 may determine and assign the priorities to each route or each set of routes in local RIB 104 by applying one or more priority determination and/or priority selection algorithms. BGP process 102 then sends the prioritized routes in local RIB 104 to RIB process 106.

Upon receipt of the routes from BGP process 102, RIB process 106 stores the routes and the priorities assigned to the routes in global RIB 108. In addition to routes received from BGP process 102, global RIB 108 may also store routes received from a variety of other routing protocols, such as, for example, Internal Gateway Protocols (IGPs). The routes in global RIB 108 that are received from the other routing protocols may or may not be assigned a specific priority. RIB process 106 may also apply one or more route selection or route configuration algorithms to the routes in global RIB 106.

FIB transfer process 110 retrieves the routes in global RIB 108 according the priorities assigned to the routes, and transfers them to FIBs 114A, 114B, and 114C of network interfaces 112A, 112B, and 112C, respectively. In some embodiments, a plurality of the network interfaces of a network element may share the same FIB. In other embodiments, such as the embodiment depicted in FIG. 1A, each network interface of a network element maintains its own FIB. In these embodiments, the FIB transfer process may transfer an identical set of routes to each of the FIBs of the network interfaces. Alternatively, the FIB process may transfer different subsets of the routes in the global RIB to each of the FIBs of the network interfaces. In either case, however, the routes are transferred from the RIB to the respective FIBs according to the priority assigned to, and stored with, the routes the global RIB.

Figure 1B:
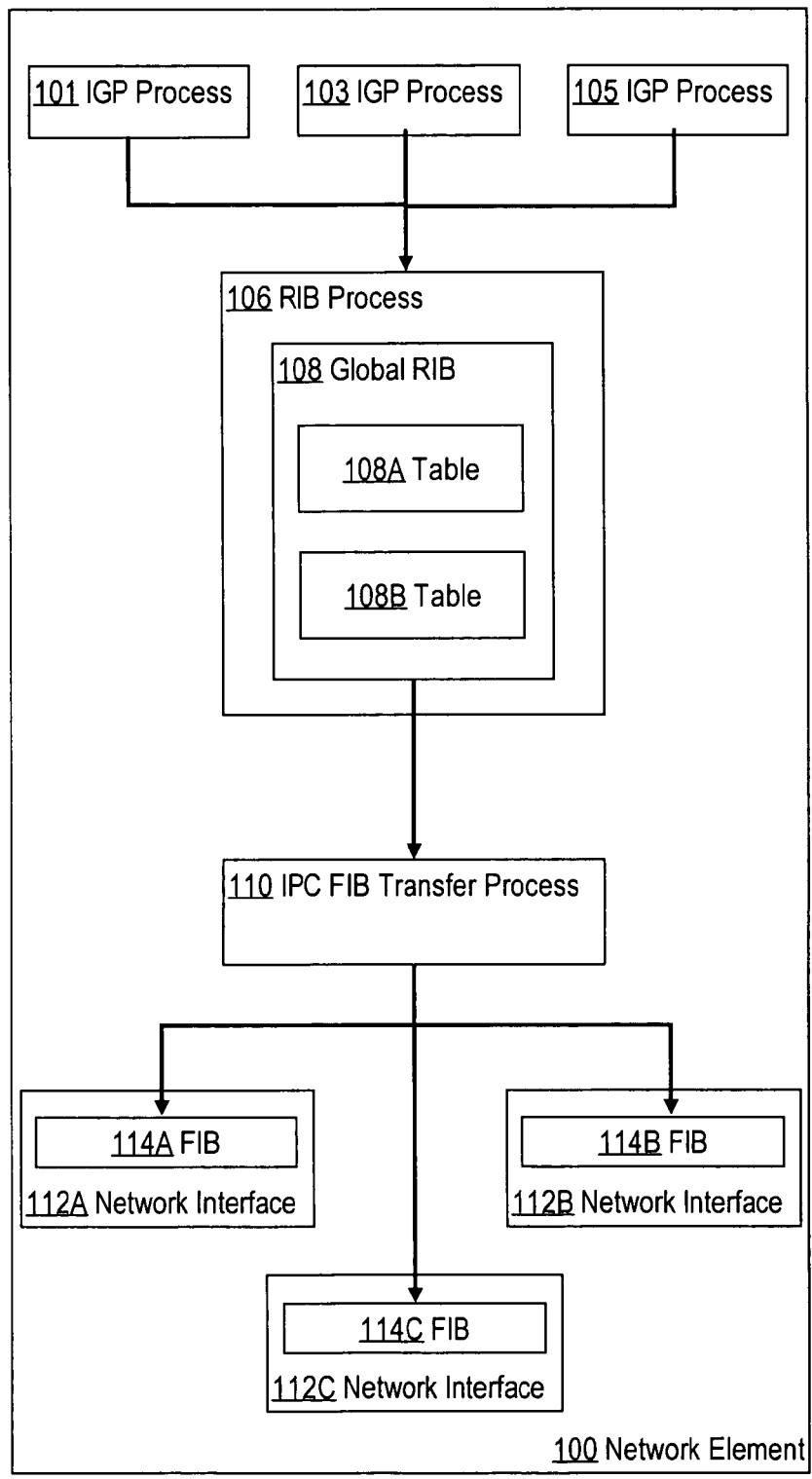
FIG. 1B is a block diagram that illustrates various components of a network element that are involved in prioritized processing of routing information according to another embodiment.

FIG. 1B is a block diagram that illustrates components of network element 100 that may be involved in the prioritized processing of routing information that is received at network element 100 from one or more IGP processes.

As depicted in FIG. 1B, network element 100 comprises IGP processes 101, 103, and 105. Network element 100 also includes RIB process 106, FIB transfer process 110, and network interfaces 112A, 112B, and 112C.

IGP processes 101, 103, and 105 are processes that each operate in conformance with an IGP protocol, such as, for example, an Open Shortest Path First (OSPF) protocol, an Intermediate System-to-Intermediate System (IS-IS) protocol, a Routing Information Protocol (RIP), and an Interior Gateway Routing Protocol (IGRP). Each of IGP processes 101, 103, and 105 receives routing information from other nodes or entities in the network, and processes this information according to its corresponding IGP protocol.

In some embodiments, an IGP process, such as IGP process 101, may be capable of tagging the routes they receive with a particular priority. For example, some implementations of the IS-IS protocol allow Internet Protocol version 4 (IPv4) address prefixes to be tagged with priorities, and the IS-IS process transfers the address prefixes to RIB process 106 based on these priorities. RIB process 106 then stores the address prefixes and their assigned priorities in global RIB 108.

In other embodiments, an IGP process, such as IGP process 105, may not be capable of assigning priorities to the address prefixes it processes. In these embodiments, IGP process 105 transfers the address prefixes it selects to one or more routing tables of global RIB 108, such as, for example, routing tables 108A and 108B. RIB process 106 then processes the received address prefixes and assigns to them a priority that is associated with the particular routing table in which the received prefixes are stored.

FIB transfer process 110 retrieves the routing information from global RIB 108 according the assigned priority, and transfers the routing information to FIBs 114A, 114B, and 114C of network interfaces 112A, 112B, and 112C, respectively.

3.0 Method of Prioritized Processing of Routing Information

At a network element, a particular priority from a plurality of priorities may be assigned to any type of routing information, such as, for example, an individual route, an address prefix, or a set of routes (such as, for example, the routes in a routing table). The particular priority is stored with the routing information in the RIB of the network element. The routing information is then transferred to the FIB or FIBs of the network element according to the particular priority. The transfer of the routing information from the RIB to the FIB or FIBs may be performed by any transfer mechanism that is capable of taking into account the priority assigned to the routing information.

For example, in some embodiments the transfer mechanism is implemented in a network element as an IPC FIB transfer process. The IPC FIB transfer process is a packet transport mechanism that itself is executed at high priority by the network element.

The IPC FIB transfer process reads routing information from the RIB and creates an IPC packet. The IPC packet includes a payload portion and a header. The payload portion of the IPC packet stores the routing information. The header of the IPC packet includes information that identifies the packet, such as, for example, a packet identifier and packet sequence bits, and other control tags. According to the techniques described herein, the header of an IPC packet that transfers routing information from the RIB to the FIBs also includes one or more priority fields for storing the particular priority assigned to the routing information.

In some embodiments, the one or more priority fields may store one or more octets that represent a priority bitmap, where each bit of the bitmap is associated with a particular priority. In an IPC packet that carries routing information in its payload portion, the particular priority of the routing information may be indicated by setting one or more bits of the octets stored in the priority fields of the header of the packet. In other embodiments, the one or more priority fields in the header of the IPC packet may store other types of data, such as, for example, numeric or string data, to indicate the particular priority of the routing information carried in the payload of the packet.

After receiving an IPC packet with routing information at a FIB, the IPC packet is parsed and the routing information is retrieved from the payload of the packet. In some embodiments, the process at the FIB that parses the IPC packet also retrieves the priority of the routing information that is stored in the header of IPC packet. The routing information is then processed at the FIB according to that priority. In other embodiments, the processing of the routing information at the FIB is not based on the priority that is received in the header of the IPC packet. In these embodiments, the priority received in the IPC packet header may be disregarded and the routing information may be processed according to the specific configuration of the FIB.

In some embodiments, the transfer of the routing information from the RIB to the FIB or FIBs may also include using a variety of now known or later developed scheduling algorithms or mechanisms that are based at least in part on the priority assigned to the routing information. For example, time-based or weighted round-robin scheduling algorithms may be used in conjunction with routing information priority in order to prevent starvation or overloading of the transfer process that downloads the routing information to the FIB or FIBs. Thus, the techniques for prioritized processing of routing information described herein may be used in conjunction with any scheduling algorithm or mechanism that is based at least in part on priority.

3.1 Prioritized Processing of VPN Routing Information

In one embodiment, one or more VPN routing tables received through a BGP protocol are prioritized over other tables thorough a configuration mechanism. A BGP process executing at a network element learns about the routes of different VPNs from BGP UPDATE messages that are received from peer BGP processes executing on other network elements. The BGP UPDATE messages usually conform to the Multi-protocol extension to BGP-4 (MP-BGP), which is described in *RFC*2858 that was published by the Internet Engineering Task Force (IETF) in June 2000. The BGP process then installs the routes of the different VPNs in the global RIB of the network element.

The global RIB at the network element keeps the routes of the different VPNs in different, logically separate VPN routing tables. According to the techniques described herein, each separate VPN routing table is assigned a priority, which priority is taken into account when the routes of that VPN table are downloaded to the FIBs of the network element. The priority may be assigned to each VPN routing table through a variety of mechanisms. For example, a user may execute a Command-Line Interface (CLI) command, such as, for example "config priority VPN1 high"

in order to assign a "High" priority to VPN routing table "VPN1". In another example, the RIB process may automatically assign a pre-configured priority to particular VPN table by reading the particular pre-configured priority from a configuration file that associates VPN routing tables with their priorities.

In some embodiments, the BGP process may assign a particular priority to the routes of a particular VPN before installing these routes in the RIB. In these embodiments, the BGP process keeps the routes of each VPN in different, logically separate Virtual Route Forwarding (VRF) tables. The BGP process may receive the particular priority for the routes in each VRF table in the BGP UPDATE messages which carry these routes, or the BGP process may learn of the particular priority from a configuration file or through a CLI command executed by a user.

For each separate VPN routing table in the RIB, the RIB process performs a route resolution by building a routing tree based on the routes received from the BGP process and on other information received from one or more IGP processes. Based on the routing tree of each VPN routing table, the RIB process selects the best paths to the VPN destinations and the best next hops for the routes in that VPN routing table.

After the RIB process selects the best routes in each VPN routing table, an IPC FIB transfer process downloads the selected routes to the FIBs of the network element in the order specified by the priorities assigned to each VPN table. For example, the IPC FIB transfer process will first complete the download of the routes in a VPN routing table that is assigned a "High" priority, and only then will download the routes from a VPN routing table that is assigned a "Low" priority. In this way, the network element provides a more timely and deterministic forwarding service for high-priority VPNs, while continuing to provide adequate forwarding services for low-priority VPNs and other low-priority routing tables of the global RIB.

3.2 Prioritized Processing of Individual Address Prefixes

In some embodiments, the techniques described herein may be used to prioritize the processing of individual address prefixes and other routing information.

An IGP process, such as, for example, a process conforming to the IS-IS protocol, may receive and process one or more address prefixes. The IGP process may be configured to assign a particular priority to certain address prefixes, links, or other routing information, through the use of administrative tagging. Administrative tagging, as referred to herein, is the process of assigning a priority tag to routing information when the routing information is being processed by an IGP process. The priority tag may represent, or be associated with, any now known or later developed prioritization scheme, such as, for example, Quality-of-Service (QoS) prioritization, Type-of-Service (ToS) prioritization, and Class-of-Service (CoS) prioritization. Further, the priority tags may be specified through user-executed CLI commands or may be stored in, and retrieved from, one or more configuration files.

For example, individual address prefixes that are likely candidates for tagging with high priority by an IGP process are BGP router IDs, which are used to resolve BGP next hops. Another type of individual address prefixes that are likely candidates for tagging with high priority are IPv4 address prefixes with a "/32" network mask because such address prefixes provide the most accurate and direct path to their respective address destinations. Further, an IGP process may also tag in a similar manner other routing information, which may not be stored in any particular routing table but which may nevertheless be downloaded to the FIBs of the network element.

After tagging certain address prefixes with a particular priority, an IGP process installs the address prefixes and the priorities assigned to them in the global RIB. In some embodiments, a RIB process may traverse the address prefixes installed in the RIB and may build one or more routing trees in order to select the best paths to certain address destinations. In these embodiments, while building a routing tree by using address prefixes that have a lower priority, the RIB process may come across one or more address prefixes that have a higher priority. If the RIB process encounters such higher priority address prefixes, the RIB process may select these address prefixes and may move them to a higher priority download queue so that they will be downloaded by a FIB transfer process to the FIBs before the other lower priority address prefixes in the routing tree that is being traversed.

3.3 Prioritized Processing of BGP Next Hop Tracking Information

In some embodiments, the techniques described herein may be used to prioritize the processing of BGP Next Hop Tracking information.

BGP Next Hop Tracking refers to an event-driven notification system to monitor the status of routes that are installed in the RIB of a network element and to report next-hop changes that affect internal BGP (iBGP) or external BGP (eBGP) prefixes directly to a BGP process that executes on the network element.

According to the techniques described herein, a RIB process may assign higher priorities to address prefixes that represent BGP next hops for iBGP or eBGP routes. When a BGP next hop prefix changes for whatever reason, in addition to triggering a report to a BGP process that executes on the network element, the changed BGP next hop prefix is downloaded to the FIBs of the network element according to its assigned priority.

Since a RIB of a network element may store hundreds or even thousands of BGP next hop address prefixes, and since BGP routes must be resolved very quickly, the prioritization processing techniques described herein provide for processing BGP next hop address prefixes in the RIB, and downloading them to the FIBs, with a higher priority than would otherwise be possible.

3.4 Prioritized Processing of Multi-Topology Routing Information

In some embodiments, the techniques described herein may be used to prioritize the processing of Multi-Topology Routing (MTR) information.

MTR is a mechanism that is used to support routing for networks of different topologies. The different types of network topologies may be based on different network address families, or may be based on one or more criteria within the same address family. For example, one type of network topology may be associated with the IPv4 unicast address family. Other types of network topologies may be associated with, for example, the IP version 6 (IPv6) unicast, IPv6 multicast, Appletalk, and IPX address families. In other examples, within the same address family there may be different types of network topologies that are associated with different classes of service, types of service, qualities of service, or with different in-band network management parameters.

In order to support MTR, the BGP and/or IGP routing protocols typically build in the RIB of a network element one or more MTR routing tables that are associated with routes of one or more types of network topologies. For example, the MTR routing tables may be associated with different address families, or with different QoS or ToS classes of the same address family.

According to the techniques described herein, priorities may be assigned to the MTR routing tables in the RIB, and/or to the individual routes or address prefixes that are stored in these routing tables. The priorities may be assigned by the IGP protocols that build the MTR routing tables, or by a RIB process that is configured to perform route selection for MTR routes in the RIB. The MTR routing tables, or the individual MTR routes or address prefixes, are then downloaded from the RIB to the FIBs according to their assigned priorities. In some embodiments, the priority assigned to MTR routing information may further be downloaded to the FIBs, and may be used to process the routing information within the FIBs.

3.5 Priority Queues and Use of the Priority Information in the FIB

Figure 2:
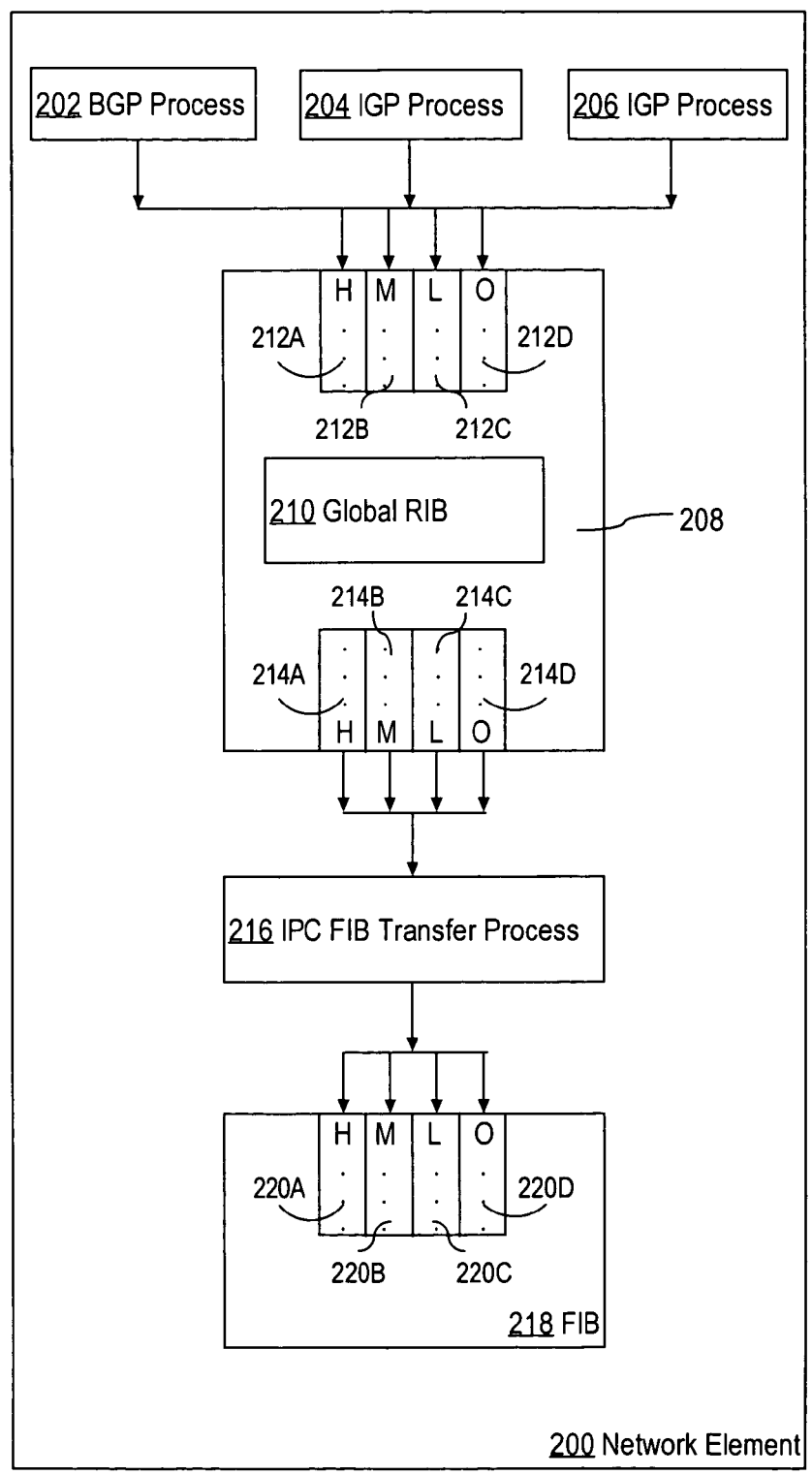
FIG. 2 is block diagram that illustrates various components of a network element that are involved in prioritized processing of routing information by making use of priority queues according to an embodiment.

In some embodiments, the techniques for prioritized processing of routing information in a network element may be implemented in conjunction with priority queues. FIG. 2 is block diagram that illustrates various components of a network element that are involved in prioritized processing of routing information by making use of priority queues according to one such embodiment.

In FIG. 2, network element 200 executes BGP process 202, and IGP processes 204 and 206. Network element also comprises RIB process 208, IPC FIB transfer process 216, and FIB 218.

In operation, BGP process 202 and IGP processes 204 and 206 are aware of the priority associated with the routing information that each of them processes. Further, BGP process 202 and IGP processes 204 and 206 communicate routing information to RIB process 208 by placing the routing information in one of inbound priority queues 212A, 212B, 212C and 212D according to the priority associated with the routing information.

Each of inbound priority queues 212A, 212B, 212C and 212D is associated with a particular priority. For example, in the embodiment depicted in FIG. 2, inbound priority queue 212A has a "High" (H) priority; inbound priority queue 212B has a "Medium" (M) priority; inbound priority queue 212C has a "Low" (L) priority; and inbound priority queue 212D has a "Other" (O) priority.

RIB process 208 processes the routing information placed in each of inbound priority queues 212A, 212B, 212C and 212D according to the priority order of each queue. For example, RIB process 208 processes the routing information that is placed in queue 212A first. When there is no more routing information left in the "High" priority queue 212A, RIB process 208 proceeds with processing the routing information in the "Medium" priority queue 212B, and so on. In this manner, RIB process 208 prioritizes the processing of routing information received from BGP process 202 and IGP processes 204 and 206.

In processing the routing information from each inbound priority queue, RIB process 208 retrieves a particular item of routing information, stores the routing information item along with its assigned priority in global RIB 210, and performs any additional processing on the routing information as may be necessary. For example, if the routing information comprises one or more routes that are stored in a packet in the inbound priority queue, RIB process 208 retrieves the packet, parses it, and validates each retrieved route. Each valid route is then installed in global RIB 210 along with the priority associated with the inbound priority queue from which the route was retrieved.

RIB process 208 may perform any route selection or route configuration algorithms on the routes stored in global RIB 210. The routes selected in global RIB 210, or any other received routing information that is prioritized, are then placed in one of the outbound priority queues 214A, 214B, 214C, and 214D.

Each of outbound priority queues 214A, 214B, 214C and 214D is associated with a particular priority. For example, in the embodiment depicted in FIG. 2, outbound priority queue 214A has a "High" (H) priority; outbound priority queue 214B has a "Medium" (M) priority; outbound priority queue 214C has a "Low" (L) priority; and outbound priority queue 214D has a "Other" (O) priority.

Since the routing information is stored in global RIB 210 along with its assigned priority, RIB process 208 places the routing information in outbound priority queues 214A, 214B, 214C, and 214D according to this assigned priority. For example, RIB process 208 places routing information that is assigned a priority of "High" in outbound priority queue 214A. Similarly, routing information in global RIB 210 that is assigned a priority of "Medium" is placed in outbound priority queue 214B, routing information that is assigned a priority of "Low" is placed in outbound priority queue 214C, and routing information that is assigned a priority of "Other" is placed in outbound priority queue 214D.

IPC FIB transfer process 216 downloads the routing information from the outbound priority queues 214A, 214B, 214C, and 214D according to the priority associated with each queue. For example, IPC FIB process 216 first drains outbound priority queue 214A. When all of the routing information in the "High" priority queue 214A is transferred to FIB 218, IPC FIB process 216 proceeds with downloading the routing information from the "Medium" priority queue 214B. When all of the routing information in the "Medium" priority queue 214B is transferred to FIB 218, IPC FIB process 216 proceeds with transferring the routing information from the "Low" priority queue 214C. When all of the routing information in the "Low" priority queue 214C is transferred to FIB 218, IPC FIB process 216 proceeds with transferring the routing information from the "Other" priority queue 214D. In this way, IPC FIB transfer process 216 downloads to FIB 218 routing information with a higher priority before downloading routing information with a lower priority.

In the embodiment depicted in FIG. 2, FIB 218 maintains inbound priority queues 220A, 220B, 220C, and 220D. Each of inbound priority queues 220A, 220B, 220C, and 220D is associated with a particular priority, "High", "Medium", "Low", and "Other", respectively. IPC FIB transfer process 216 reads routing information from queues 214A, 214B, 214C, and 214D, and, according to the particular priority of the queue from which the routing information is read, places this routing information in the corresponding inbound priority queue 220A, 220B, 220C, or 220D of FIB 218. The routing information placed in any of inbound priority queues 220A, 220B, 220C, and 220D is them processed at FIB 218 according to the priority of the particular inbound priority queue. In this way, the priority assigned to any routing information in RIB 210 is carried over to, and used in, FIB 218.

The particular operational context and the components depicted in FIG. 2 are only one example of how priority queues may be used in conjunction with the techniques described herein. In some embodiments, the number of inbound priority queues and the number of outbound priority queues managed by RIB process 208 may differ. In other embodiments, RIB process 208 may make use of only inbound priority queues or only outbound priority queues, but not both. In yet other embodiments, FIB 218 may not make use of inbound priority queues, and may process the routing information transferred by IPC FIB 216 in the order the information is received. Thus, techniques for prioritized processing of routing information described herein are not limited to any particular use of priority queues, and the operational context and components depicted in FIG. 2 are to be regarded in an illustrative rather than a restrictive sense.

3.6 Additional Features and Alternative Embodiments

In some embodiments, a network element may comprise a plurality of Route Processors (RPs). Each RP may be associated with a separate RIB and a separate set of network interfaces that store their own FIBs. In these embodiments, one RP may install routing information in the RIBs of other RPs according to the techniques described herein. For example, a specific RP may maintain in its own RIB one or more routing tables that are each assigned a particular priority. The specific RP may then install any or all of these routing tables, along with their assigned priorities, in the RIB of any other RP of the network element by making use of any known IPC mechanisms.

In other embodiments, the techniques described herein may be implemented in various distributed systems and virtual routers. In these embodiments, a variety of entities may assign priority to routing information and may install this prioritized routing information in the various RIBs maintained by the distributed system or virtual router. For example, an IGP process executing at one network element of a virtual router may install in the RIB of another network element of the virtual router a set of routes to which the IGP process has assigned a particular priority. In another example, an IGP process executing on a local node of a distributed system may install a set of routes, and the priority assigned to this set of routes, in the RIB of a remote node of the distributed system. In yet another example, the entire RIB of a node in a distributed system may be replicated to the RIB of another node in the distributed system.

4.0 implementation mechanisms—hardware overview

Figure 4:
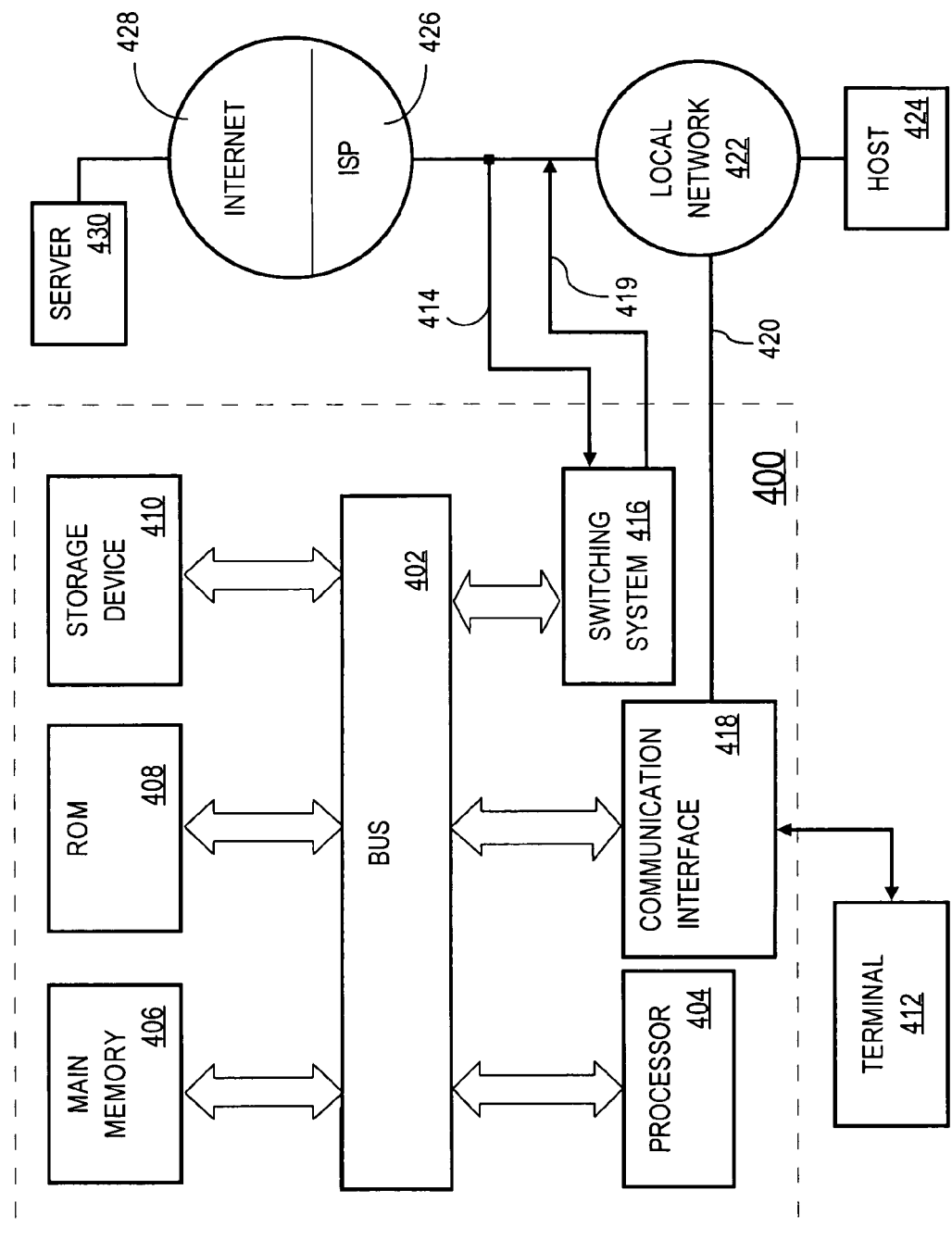
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for prioritized processing of routing information. According to one embodiment of the invention, prioritized processing of routing information is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for prioritized processing of routing information as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of prioritizing the processing of information in a network element, the method comprising the computer-implemented steps of:

assigning a priority to a particular routing table that stores routing information received at the network element;

wherein the particular routing table is one of a plurality of routing tables stored in a Routing Information Base (RIB) at the network element;

wherein the priority is a particular priority of a plurality of priorities that can be assigned to each of the plurality of routing tables;

storing the priority in association with the particular routing table that stores the routing information in the RIB of the network element; and transferring the routing information within the network element from the RIB to a Forwarding Information Base (FIB) of the network element according to the priority assigned to the particular routing table that stores the routing information;

wherein the step of transferring the routing information within the network element comprises transferring the routing information before transferring from the RIB to the FIB other routing information that is stored in other routing tables that are assigned a lower priority, of the plurality of priorities, than the particular priority.

2. A method as recited in claim 1, wherein the plurality of priorities are specified in configuration data, wherein each of the plurality of priorities is associated in the configuration data with one or more types of routing information.

3. A method as recited in claim 1, wherein:

the step of transferring the routing information from the RIB to the FIB further comprises transferring the routing information only when no other routing information, which is stored in another routing table that is assigned a higher priority of the plurality of priorities than the particular priority, is available for transfer from the RIB to the FIB.

4. A method as recited in claim 1, wherein:

the routing information comprises routes stored in a Border Gateway Protocol (BGP) routing table;

the method further comprises:

receiving a BGP message at a BGP process that executes on the network element, wherein the BGP message includes one or more routes;

storing the one or more routes in the BGP routing table;

selecting a first set of the one or more routes for transferring to the particular routing table in the RIB; and the BGP process assigning the priority to the first set of the one or more routes in the BGP routing table.

5. A method as recited in claim 4, wherein the BGP message further includes first data that associates the priority with the one or more routes.

6. A method as recited in claim 4, wherein the BGP routing table is a Virtual Route Forwarding (VRF) table that is associated with a Virtual Private Network (VPN).

7. A method as recited in claim 1, wherein:
an Interior Gateway Protocol (IGP) message is received at an IGP process that executes on the network element, wherein the IGP message includes one or more address prefixes and first data that associates the priority with the one or more address prefixes; and
the routing information comprises the one or more address prefixes.

8. A method as recited in claim 1, wherein the routing information comprises one or more address prefixes that represent next hops for one or more routes stored in the RIB of the network element.

9. A method as recited in claim 1, wherein:
the routing information is received at the network element from one or more Interior Gateway Protocol (IGP) processes, wherein the routing information is stored in one or more routing tables, of the plurality of routing tables, that are associated with one or more types of network topologies; and
a specific priority of the plurality of priorities is assigned to each routing table of the one or more routing tables.

10. A method as recited in claim 1, wherein transferring the routing information from the RIB to the FIB further comprises transferring the priority assigned to the particular routing table that stores the routing information by storing the priority in the header of an Inter-Processor Communication (IPC) packet that transfers the routing information from the RIB to the FIB.

11. A method of prioritizing the processing of information in a network element, the method comprising the computer-implemented steps of:
assigning a particular priority, of a plurality of priorities, to a particular routing table that can store a particular set of routes of one or more sets of routes that are received at the network element;
wherein the particular routing table is one of a plurality of routing tables stored in a Routing Information Base (RIB) at the network element;
wherein each of the plurality of routing tables can be assigned one of the plurality of priorities;
installing the particular set of routes in the particular routing table in the RIB of the network element, wherein the particular priority assigned to the particular routing table is stored in the RIB; and
according to the particular priority assigned to the particular routing table that stores the particular set of routes, transferring the particular set of routes and the particular priority within the network element from the RIB to one or more Forwarding Information Bases (FIBs) that are associated with one or more network interfaces of the network element;
wherein the step of transferring the particular set of routes within the network element comprises transferring the particular set of routes before transferring from the RIB to the one or more FIBs another set of routes that is stored in another routing table that is assigned a lower priority, of the plurality of priorities, than the particular priority.

12. A method as recited in claim 11, further comprising placing the particular set of routes in a particular queue of a plurality of queues maintained at the RIB, wherein each of the plurality of queues is associated with one priority of the plurality of priorities, and wherein the particular queue is associated with the particular priority.

13. A method as recited in claim 12, wherein placing the particular set of routes in the particular queue is performed before installing the particular set of routes in the particular routing table in the RIB.

14. A method as recited in claim 12, wherein the step of placing the particular set of routes in the particular queue is performed after installing the particular set of routes in the particular routing table in the RIB.

15. A method as recited in claim 12, wherein transferring the particular set of routes and the particular priority from the RIB to the one or more FIBs further comprises retrieving the particular set of routes from the particular queue only when there are no sets of routes to retrieve from any queue that is associated with a priority of the plurality of priorities that is higher than the particular priority.

16. A method as recited in claim 11, wherein transferring the particular set of routes and the particular priority from the RIB to the one or more FIBs further comprises using one or more scheduling algorithms that are based at least in part on the particular priority.

17. An apparatus, comprising:
one or more processors;
a network interface that is coupled to the one or more processors and to a packet-switched data network for sending and receiving one or more packet flows therefrom;
a Routing Information Base (RIB);
a Forwarding Information Base (FIB) coupled communicatively to the RIB; and
one or more stored sequences of instructions, which instructions, when executed by the one or more processors, are operable at least to:
assign a priority to a particular routing table that stores routing information received at the network interface;
wherein the particular routing table is one of a plurality of routing tables stored in the RIB;
wherein the priority is a particular priority of a plurality of priorities that can be assigned to each of the plurality of routing tables;
store the priority in association with the particular routing table that stores the routing information in the RIB; and
transfer the routing information within the network element from the RIB to the FIB according to the priority assigned to the particular routing table that stores the routing information;
wherein the routing information is transferred within the network element before transferring from the RIB to the FIB other routing information that is stored in other routing tables that are assigned a lower priority, of the plurality of priorities, than the particular priority.

18. The apparatus of claim 17, wherein the one or more stored sequences of instructions further comprise instructions which, when executed by the one or more processors, are operable to retrieve the plurality of priorities from configuration data, wherein each of the plurality of priorities is associated in the configuration data with one or more types of routing information.

19. The apparatus of claim 17, wherein:
the one or more stored sequences of instructions further comprise instructions which, when executed by the one or more processors, are operable to store the plurality of priorities; and the instructions that are operable to transfer the routing information are further operable to transfer the routing information from the RIB to the FIB only when no other routing information, which is stored in another routing table that is assigned a higher priority of the plurality of priorities than the particular priority, is available for transfer from the RIB to the FIB.

20. The apparatus of claim 17, wherein the instructions that are operable to transfer the routing information from the RIB to the FIB are further operable to use one or more scheduling algorithms that are based at least in part on the priority.

21. The apparatus of claim 17, wherein:
the routing information comprises routes stored in a Border Gateway Protocol (BGP) routing table;
the one or more stored sequences of instructions further comprise instructions which, when executed by the one or more processors, are operable to:
execute a BGP process that manages the BGP routing table;
receive a BGP message at the BGP process, wherein the BGP message includes one or more routes;
store the one or more routes in the BGP routing table;
select a first set of the one or more routes for transferring to the particular routing table in the RIB; and
the BGP process is operable to assign the priority to the first set of the one or more routes in the BGP routing table.

22. The apparatus of claim 21, wherein the BGP message further includes first data that associates the priority with the one or more routes.

23. The apparatus of claim 21, wherein the BGP routing table is a Virtual Route Forwarding (VRF) table that is associated with a Virtual Private Network (VPN).

24. The apparatus of claim 17, wherein:
the one or more stored sequences of instructions further comprise instructions which, when executed by the one or more processors, are operable to execute an Interior Gateway Protocol (IGP) process that is operable to receive an IGP message, wherein the IGP message includes one or more address prefixes and first data that associates the priority with the one or more address prefixes; and
the routing information comprises the one or more address prefixes.

25. The apparatus of claim 17, wherein the routing information comprises one or more address prefixes that represent next hops for one or more routes stored in the RIB.

26. The apparatus of claim 17, wherein:
the one or more stored sequences of instructions further comprise instructions which, when executed by the one or more processors, are operable to execute one or more Interior Gateway Protocol (IGP) processes that are operable to receive the routing information;
the routing information is stored in one or more routing tables, of the plurality of routing tables, that are associated with one or more types of network topologies; and
a specific priority of the plurality of priorities is assigned to each routing table of the one or more routing tables.

27. The apparatus of claim 17, wherein the instructions that are operable to transfer the routing information from the RIB to the FIB are further operable to transfer the priority assigned to the particular routing table that stores the routing information by storing the priority in the header of an Inter-Processor Communication (PC) packet that transfers the routing information from the RIB to the FIB.

28. An apparatus, comprising:
means for assigning a particular priority, of a plurality of priorities, to a particular routing table that can store a particular set of routes of one or more sets of routes that are received at the apparatus;
wherein the particular routing table is one of a plurality of routing tables stored in a Routing Information Base (RIB) at the apparatus;
wherein each of the plurality of routing tables can be assigned one of the plurality of priorities;
means for installing the particular set of routes in the particular routing table in the RIB of the apparatus, wherein the particular priority assigned to the particular routing table is stored in the RIB; and
means for transferring within the apparatus, according to the particular priority, the particular set of routes and the particular priority from the RIB to one or more Forwarding Information Bases (FIBs) that are associated with one or more network interfaces of the apparatus;
wherein the means for transferring the particular set of routes within the network element comprise means for transferring the particular set of routes before transferring from the RIB to the one or more FIBs another set of routes that is stored in another routing table that is assigned a lower priority, of the plurality of priorities, than the particular priority.

29. The apparatus of claim 28, further comprising means for placing the particular set of routes in a particular queue of a plurality of queues maintained at the RIB, wherein each of the plurality of queues is associated with one priority of the plurality of priorities, and wherein the particular queue is associated with the particular priority.

30. The apparatus of claim 29, further comprising means for placing the particular set of routes in the particular queue before installing the particular set of routes in the particular routing table in the RIB.

31. The apparatus of claim 29, further comprising means for placing the particular set of routes in the particular queue after installing the particular set of routes in the particular routing table in the RIB.

32. The apparatus of claim 29, wherein the means for transferring the particular set of routes and the particular priority from the RIB to the one or more FIBs further comprise means for retrieving the particular set of routes from the particular queue only when there are no sets of routes to retrieve from any queue that is associated with a priority of the plurality of priorities that is higher than the particular priority.

33. A computer-readable volatile or non-volatile medium storing one or more sequences of instructions for prioritizing the processing of information in a network element, which instructions, when executed by one or more processors, cause the one or more processors to perform the steps of:
assigning a priority to a particular routing table that stores routing information received at the network element;
wherein the particular routing table is one of a plurality of routing tables stored in a Routing Information Base (RIB) at the network element;
wherein the priority is a particular priority of a plurality of priorities that can be assigned to each of the plurality of routing tables;
storing the priority in association with the particular routing table that stores the routing information in the RIB of the network element; and
transferring the routing information within the network element from the RIB to a Forwarding Information Base (FIB) of the network element according to the priority assigned to the particular routing table that stores the routing information;
wherein the step of transferring the routing information within the network element comprises transferring the routing information before transferring from the RIB to the FIB other routing information that is stored in other routing tables that are assigned a lower priority, of the plurality of priorities, than the particular priority.

34. The computer-readable volatile or non-volatile medium of claim 33, wherein the plurality of priorities are specified in configuration data, wherein each of the plurality of priorities is associated in the configuration data with one or more types of routing information.

35. The computer-readable volatile or non-volatile medium of claim 33, wherein:
the routing information comprises routes stored in a Border Gateway Protocol (BGP) routing table;
the one or more sequences of instructions further comprise instructions which, when executed by the one or more processors, cause the one or more processors to perform the steps of:
receiving a BGP message at a BGP process that executes on the network element, wherein the BGP message includes one or more routes;
storing the one or more routes in the BGP routing table;
selecting a first set of the one or more routes for transferring to the particular routing table in the RIB; and
the BGP process assigning the priority to the first set of the one or more routes in the BGP routing table.

36. The computer-readable volatile or non-volatile medium of claim 33, wherein:
an Interior Gateway Protocol (IGP) message is received at an IGP process that executes on the network element, wherein the IGP message includes one or more address prefixes and first data that associates the priority with the one or more address prefixes; and
the routing information comprises the one or more address prefixes.

37. The computer-readable volatile or non-volatile medium of claim 33, wherein:
the routing information is received at the network element from one or more Interior Gateway Protocol (IGP) processes, wherein the routing information is stored in one or more routing tables, of the plurality of routing tables, that are associated with one or more types of network topologies; and
a specific priority of the plurality of priorities is assigned to each routing table of the one or more routing tables.

38. The computer-readable volatile or non-volatile medium of claim 33, wherein the instructions that cause the one or more processors to perform the step of transferring the routing information from the RIB to the FIB further comprise instructions which, when executed by the one or more processors, cause the one or more processors to perform the step of transferring the priority assigned to the particular routing table that stores the routing information by storing the priority in the header of an Inter-Processor Communication (IPC) packet that transfers the routing information from the RIB to the FIB.

39. A computer-readable volatile or non-volatile medium storing one or more sequences of instructions for prioritizing the processing of information in a network element, which instructions, when executed by one or more processors, cause the one or more processors to perform the steps of:
assigning a particular priority, of a plurality of priorities, to a particular routing table that can store a particular set of routes of one or more sets of routes that are received at the network element;
wherein the particular routing table is one of a plurality of routing tables stored in a Routing Information Base (RIB) at the network element:
wherein each of the plurality of routing tables can be assigned one of the plurality of priorities;
installing the particular set of routes in the particular routing table in the RIB of the network element, wherein the particular priority assigned to the particular routing table is stored in the RIB; and
according to the particular priority assigned to the particular routing table that stores the particular set of routes, transferring the particular set of routes and the particular priority within the network element from the RIB to one or more Forwarding Information Bases (FIBs) that are associated with one or more network interfaces of the network element;
wherein the step of transferring the particular set of routes within the network element comprises transferring the particular set of routes before transferring from the RIB to the one or more FIBs another set of routes that is stored in another routing table that is assigned a lower priority, of the plurality of priorities, than the particular priority.

40. The computer-readable volatile or non-volatile medium of claim 39, wherein the one or more sequences of instructions further comprise instructions which, when executed by the one or more processors, cause the one or more processors to perform the step of placing the particular set of routes in a particular queue of a plurality of queues maintained at the RIB, wherein each of the plurality of queues is associated with one priority of the plurality of priorities, and wherein the particular queue is associated with the particular priority.

41. The computer-readable volatile or non-volatile medium of claim 40, wherein the instructions that cause the one or more processors to perform the step of transferring the particular set of routes and the particular priority from the RIB to the one or more FIBs further comprise instructions which, when executed by the one or more processors, cause the one or more processors to perform the step of retrieving the particular set of routes from the particular queue only when there are no sets of routes to retrieve from any queue that is associated with a priority of the plurality of priorities that is higher than the particular priority.

42. The computer-readable volatile or non-volatile medium of claim 39, wherein the instructions that cause the one or more processors to perform the step of transferring the particular set of routes and the particular priority from the RIB to the one or more FIBs further comprise instructions which, when executed by the one or more processors, cause the one or more processors to perform the step of using one or more scheduling algorithms that are based at least in part on the particular priority.

* * * * *

UNITED STATES PATENT AND TRADEMARK OFFICE
CERTIFICATE OF CORRECTION

PATENT NO. : 7,778,248 B2 Page 1 of 1
APPLICATION NO. : 11/262060
DATED : August 17, 2010
INVENTOR(S) : John Scudder, David Ward and Paul Jensen It is certified that error appears in the above-identified patent and that said Letters Patent is hereby corrected as shown below:

In column 19, line 63, claim 27, delete "(PC)" and insert --(IPC)--.

Signed and Sealed this

Ninth Day of November, 2010

David J. Kappos
*Director of the United States Patent and Trademark Office*